March 12, 1929.  C. R. FOURNIER  1,705,049
BORING INSTRUMENT
Filed Feb. 18, 1926

INVENTOR
Charles R. Fournier
BY
Mason Fenwick & Lawrence
ATTORNEY

Patented Mar. 12, 1929.

1,705,049

UNITED STATES PATENT OFFICE.

CHARLES R. FOURNIER, OF EVERETT, WASHINGTON, ASSIGNOR TO HARRY W. HOWLAND, OF SEATTLE, WASHINGTON.

BORING INSTRUMENT.

Application filed February 18, 1926. Serial No. 89,182.

This invention relates to boring instruments, and particularly to tubular boring instruments with cutting teeth on one end of the tube, and means for ejecting from the tube, any part of the cuttings that may be lodged within the tube.

The objects of the invention are to provide a boring instrument for cutting circular holes without cutting into shavings or small particles all of the material within the radius of the aperture, but only a narrow channel around the inner periphery of the hole and thus avoid the necessity of using sufficient power to cut up the entire portion of the material from the hole, as is ordinarily done by the common augers and boring instruments; and further to provide a movable center member for holding the instrument in true position on the material to be cut, and also for forcing out from the interior of the instrument the fragment which may have been severed from the material cut.

Figure 1:
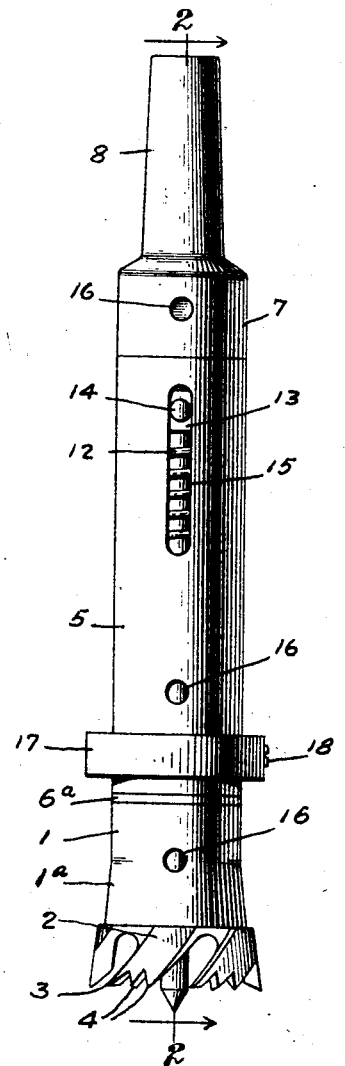

With these, and other objects as will be more fully shown in the following specification and description, I have illustrated my invention by the accompanying drawings, of which, Fig. 1 is a front elevation with all parts assembled.

Figure 2:
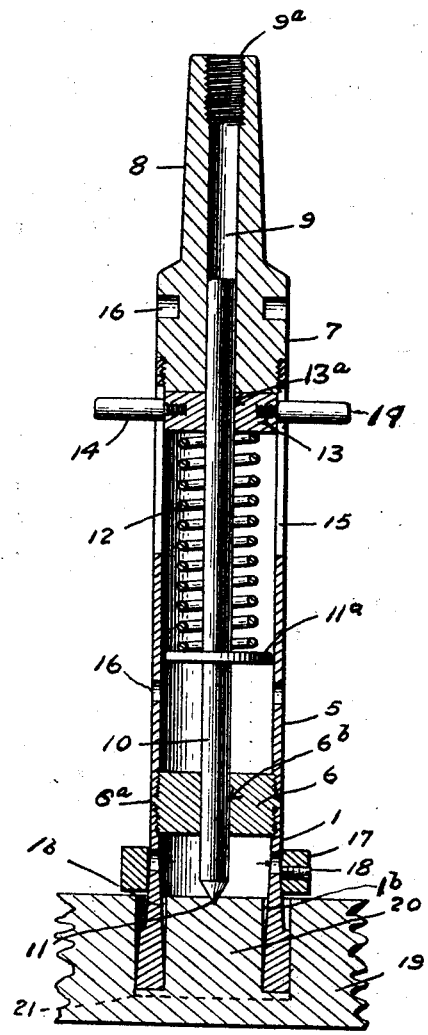

Fig. 2 shows a front elevation in section, with the cutting part of the instrument embedded in a block of wood and the movable center member pressed up into the instrument shell by the wood.

Like numerals on the different figures represent like parts. Numeral 1 is the cutter head of tubular form, with a series of cutting teeth 2, suitably spaced around the cutting end of the head to permit the shavings or sawdust to pass back from the teeth and up past a tapered portion 1ª of the head. The leading tooth section 3 is given considerable clearance and preferably followed by two others 4, for raking out the cuttings.

The head 1, is attached to a holding tube 5, by an abutment block 6, the latter provided with a central rib 6ª for holding the tubular parts in their respective positions while threaded on the block 6, and a hole 6ᵇ extends through the abutment for the slidable adjustment of a center member or plunger 10. The opposite end of the tube 5 is threaded or otherwise adjustably connected with a shank member 7 which is provided with tapered extension 8 for fitting in to any ordinary chuck for holding boring instruments. The extension 8 is also provided with an inner threaded connection 9ª for attachment on a driving spindle in lieu of the chuck. The shank is provided with a hole centrally therethrough for the easy guidance of the plunger 10, and the lower end of the plunger is sharpened as 11 for fitting into any center hole provided by the workman for determining where the material shall be cut out.

Affixed to the plunger is a plate or washer 11ª, and a helical spring 12 is mounted around the plunger between the plate 11ª and a movable block 13 which is slidably mounted within the tube 5 with a hole 13ª therethrough for the plunger to operate freely. Studs 14 are affixed into opposite sides of the block 13 which extends outward through slots 15 in the walls of the tube 5. These studs may be used by the operator for forcing the center point 11 into the material to be cut, and also for positively ejecting any part of the material which may become lodged in the cutter head portion in operation.

Suitable holes 16 are provided in the several parts of the tool, for facilitating the connection and disconnection thereof by a suitable spanner wrench, etc., and a gauge collar 17 is mounted at any desired position on the head 1 or central tube 5 for determining the depth to which the material operated upon shall be cut, and a set screw 18 may be used to hold the collar in the predetermined position. In Figure 2 is shown a piece of material as 19, into which the cutter head 1 has cut its way, leaving a central section of the material as 20, within the walls or shell of the cutter head. The dotted line 21 illustrates the point to which the cutter is designed to penetrate in this particular instance for the purpose of forming a mortice in the material when the core 20 is removed by a chisel or other tool.

The inner walls of the head piece 1 have a greater diameter between them as they extend back from the head, thus assuring clearance 1ᵇ for the core 20 to readily advance upward as the teeth cut downward, and also to prevent the core becoming wedged or tight in the head.

What I claim is:

A tool of the character indicated comprising a shank part provided with a through axial bore, said shank tapered at one end and exteriorly threaded at the other end, a tubular body interiorly threaded at each end, a circular abutment block having a medial circumferential rib, said block threaded on each side of said rib and having an axial bore, a tubular cutter having helically disposed teeth at one end and being threaded interiorly on the other end, said teeth being of greater radial thickness at their bottom or cutting end, said tubular body and tubular cutter adapted to be screwed on to said abutment block on opposite sides of said rib and into locking engagement therewith, a centering rod slidable through the bores in the shank and the abutment block and means within the tubular body for forcing the centering rod downwardly toward the teeth of the cutter.

In testimony whereof I affix my signature.

CHARLES R. FOURNIER.